United States Patent
Yoshizawa et al.

(10) Patent No.: US 7,391,438 B2
(45) Date of Patent: Jun. 24, 2008

(54) CAMERA DEVICE AND METHOD AND PROGRAM FOR STARTING THE CAMERA DEVICE

(75) Inventors: Kenji Yoshizawa, Ome (JP); Yasushi Maeno, Higashimurayama (JP); Koki Nakamura, Sakado (JP); Jun Hosoda, Hanno (JP); Hidetoshi Sumi, Higashiyamato (JP); Tetsuya Hayashi, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 635 days.

(21) Appl. No.: 10/787,446

(22) Filed: Feb. 25, 2004

(65) Prior Publication Data

US 2004/0170421 A1    Sep. 2, 2004

(30) Foreign Application Priority Data

Feb. 27, 2003    (JP)    ............................. 2003-051812

(51) Int. Cl.
| | |
|---|---|
| H04N 5/225 | (2006.01) |
| H04N 9/04 | (2006.01) |
| H04N 5/232 | (2006.01) |
| G03B 7/26 | (2006.01) |
| G06F 9/00 | (2006.01) |
| G06F 9/24 | (2006.01) |
| G06F 15/177 | (2006.01) |

(52) U.S. Cl. .............................. 348/207.99; 348/211.6; 396/280; 713/1; 713/2

(58) Field of Classification Search ...................... 713/1, 713/2; 396/76, 77, 90, 103; 348/207.99, 348/211.6, 372

See application file for complete search history.

(56) References Cited

U.S. PATENT DOCUMENTS

| | | | | |
|---|---|---|---|---|
| 5,424,776 A | * | 6/1995 | Hirasawa | ..................... 348/345 |
| 5,819,120 A | | 10/1998 | Hamada et al. | |
| 6,097,548 A | | 8/2000 | Funahashi et al. | |
| 6,212,632 B1 | * | 4/2001 | Surine et al. | ................... 713/2 |
| 6,341,201 B1 | | 1/2002 | Ishiguro et al. | |

(Continued)

FOREIGN PATENT DOCUMENTS

EP    1 083 740 A2    2/2001

(Continued)

OTHER PUBLICATIONS

Related U.S. Appl. No. 10/785,534, filed Feb. 23, 2004; Inventor: T. Hayashi et al.; Title: Camera Device and Method and Program for Starting the Camera Device.

(Continued)

*Primary Examiner*—David Ometz
*Assistant Examiner*—Wanda M. Negrón
(74) *Attorney, Agent, or Firm*—Frishauf, Holtz, Goodman & Chick, P.C.

(57) ABSTRACT

A camera device comprises an optical system driven to a predetermined position upon initialization when a photographing mode has been set, a memory including an area for storing lens information inherent to the optical system, an area for storing a file management program, and a management area which is managed by using the file management program, the area for storing the lens information differing from the management area, and a controller which controls the initialization of the optical system based on the lens information stored in the memory.

5 Claims, 7 Drawing Sheets

U.S. PATENT DOCUMENTS

| | | | |
|---|---|---|---|
| 6,401,202 | B1 | 6/2002 | Abgrall |
| 6,470,413 | B1 | 10/2002 | Ogawa |
| 6,487,656 | B1 * | 11/2002 | Kim et al. ............... 713/2 |
| 6,766,474 | B2 * | 7/2004 | Schelling ............... 714/36 |
| 7,129,984 | B1 * | 10/2006 | Okada et al. ............ 348/372 |
| 2001/0007472 | A1 | 7/2001 | Nishimura |
| 2001/0009443 | A1 * | 7/2001 | Suemoto et al. .......... 348/358 |
| 2002/0171755 | A1 | 11/2002 | Nishimura |
| 2004/0165073 | A1 | 8/2004 | Hayashi et al. |
| 2004/0165096 | A1 | 8/2004 | Maeno et al. |
| 2004/0169743 | A1 | 9/2004 | Hosoda et al. |

FOREIGN PATENT DOCUMENTS

| | | | |
|---|---|---|---|
| JP | 2001-268413 | A | 9/2001 |
| JP | 2001268413 | A * | 9/2001 |
| JP | 2002-237977 | A | 8/2002 |
| KR | 1991-0006855 | B1 | 4/1991 |
| KR | 1996-0018747 | B1 | 6/1996 |
| KR | 1999-0037012 | A | 5/1999 |
| KR | 2002-0010846 | A | 2/2002 |

OTHER PUBLICATIONS

Related U.S. Appl. No. 10/787,445, filed Feb. 25, 2004; Inventor: Y. Maeno et al.; Title: Camera Device and Method and Program for Starting the Camera Device.

Related U.S. Appl. No. 10/787,447, filed Feb. 25, 2004; Inventor: J. Hosoda et al.; Title: Camera Device and Method and Program for Starting the Camera.

* cited by examiner

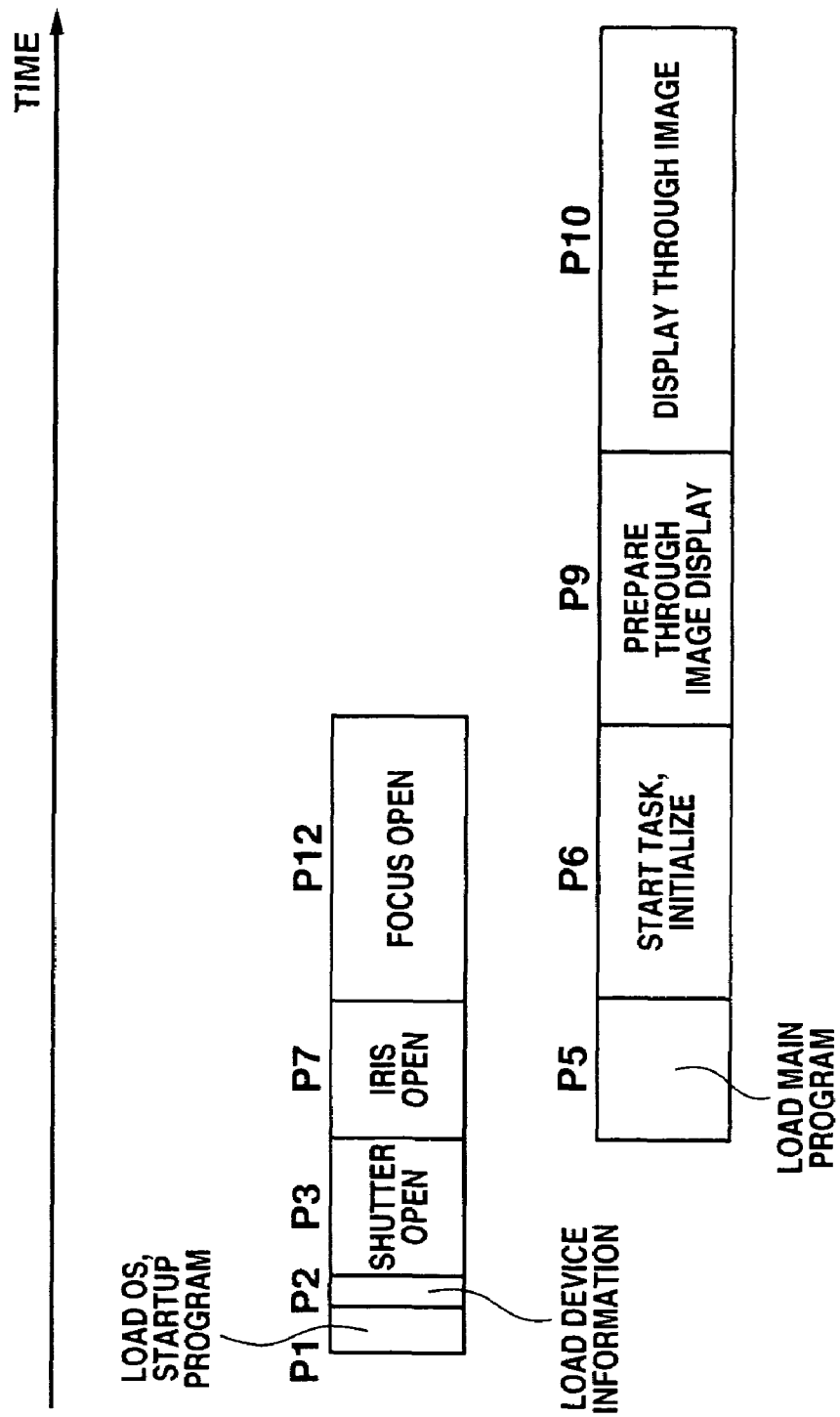

CAMERA DEVICE AND METHOD AND PROGRAM FOR STARTING THE CAMERA DEVICE

CROSS-REFERENCE TO RELATED APPLICATIONS

This application is based upon and claims the benefit of priority from prior Japanese Patent Application No. 2003-051812, filed Feb. 27, 2003, the entire contents of which are incorporated herein by reference.

BACKGROUND OF THE INVENTION

1. Field of the Invention

The present invention relates to a camera device having a movable optical system, and a method and a program for starting the camera device.

2. Description of the Related Art

Conventionally, in electronic still cameras or digital cameras, an object is picked up by an image pickup element such as a CCD or the like, and while the image is being displayed as a through image on a liquid crystal display device, the picked-up image is recorded as digital data on a recording medium such as a memory card or the like in accordance with an operation of a shutter. Accordingly, at the time of startup when the power supply of an electronic still camera is turned on for photographing, various initializing operations with respect to both of the hardware and the software, for example, such as a preparation for making data to be able to be recorded on a recording medium, a preparation for image picking-up an object, and a preparation for displaying the picked-up image, are indispensable. As a time from the power-on until when it is in a state in which photographing is available, a given starting time which is longer than that in the case of a silver salt, camera or an analog camera is required. Therefore, there is the shortcoming that the electronic still cameras or the digital cameras cannot cope with an urgent chance to press a shutter key.

Therefore, in order to make shortening of the above-described starting time to be possible, a conventional example in which a time of reading management information from an freely attachable and detachable memory card is omitted is disclosed in paragraph 0025 of Japanese Patent Application KOKAI Publication No. 2002-237977.

However, in an electronic still camera, which has a movable or sinkable optical system in which a lens is housed in a camera housing during non-photographing and it is necessary to protrude the zoom lens prior to photographing, the time required for protruding the optical system accounts for most of the starting time. Therefore, even if the time of reading management information from a memory card is omitted as in the conventional document, the time accounts for extremely small percentage of the total starting time, and there is the problem that an effect on reduction in starting time has not been satisfactory yet.

BRIEF SUMMARY OF THE INVENTION

The present invention has been achieved in consideration of the conventional problem, and an object of the present invention is to provide a camera device which can reduce the starting time in an electronic still camera having a movable optical system, a method for starting the camera device, and a program used for realizing those.

According to an embodiment of the present invention, a camera device comprises an optical system driven to a predetermined position upon initialization when a photographing mode has been set; a memory including an area for storing lens information inherent to the optical system, an area for storing a file management program, and a management area which is managed by using the file management program, the area for storing the lens information differing from the management area; and a controller which controls the initialization of the optical system based on the lens information stored in the memory.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 7 shows a sequence of main operations performed after the camera device is started when the recording mode is set according to a second embodiment of the invention.

DETAILED DESCRIPTION OF THE INVENTION

Figure 1:
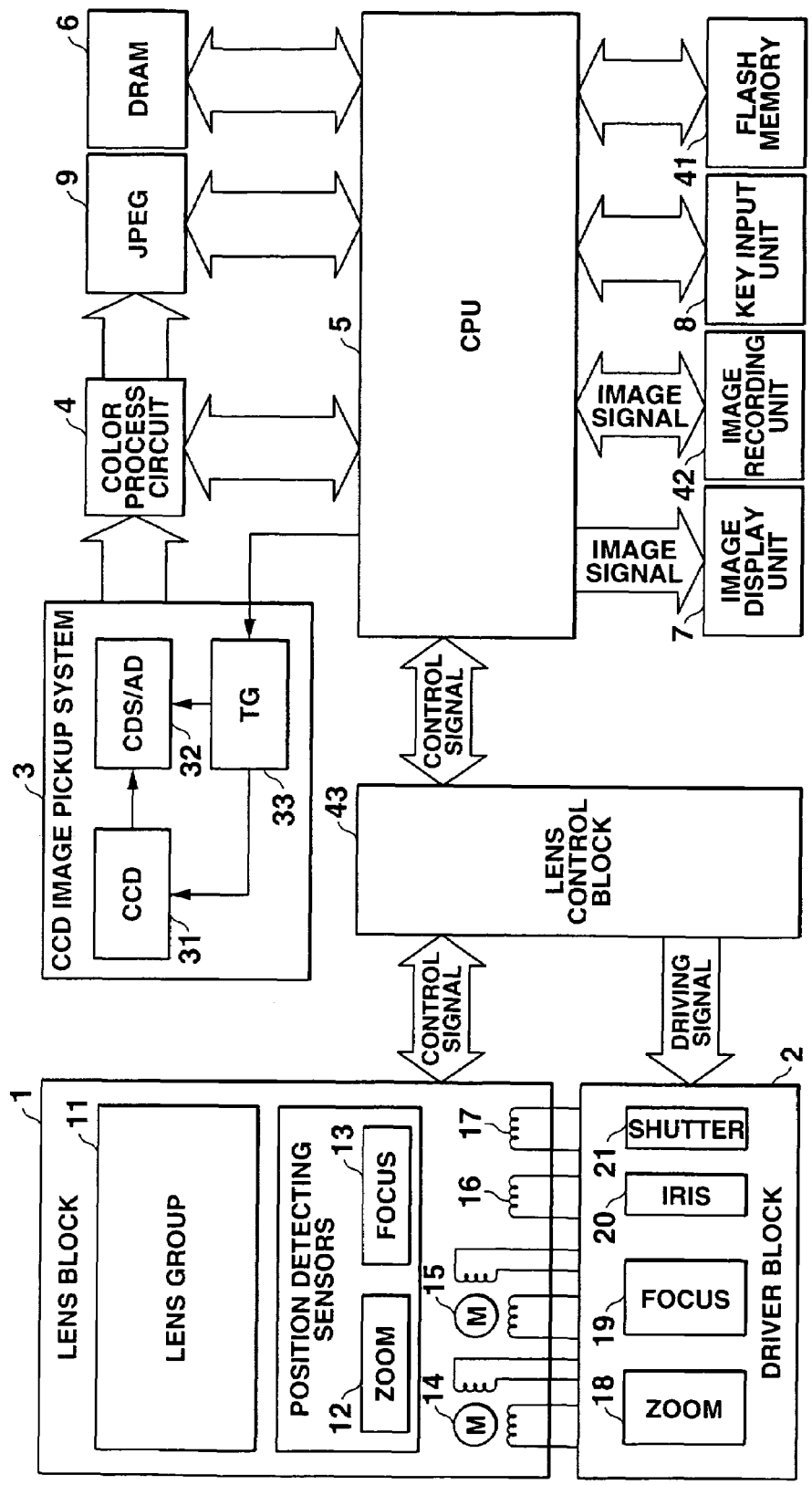
FIG. 1 is a block diagram schematically illustrating an electronic still camera showing an embodiment of the present invention.

An embodiment of a camera device according to the present invention will now be described with reference to the accompanying drawings. FIG. 1 is a block diagram illustrating an electrical configuration of an electronic still camera showing the embodiment of the present invention.

The electronic still camera has a zooming function and an automatic focusing function, and has a lens block 1 for realizing the functions. The lens block 1 comprises a movable lens group 11 including a zoom lens and a focus lens which are movably arranged in the direction of an optical axis, position detecting sensors 12, 13 for a zoom position and a focus position in the lens group 11, a zoom motor 14 for moving the zoom lens and a focus motor 15 for moving the focus lens, an actuator 16 for an iris which opens and closes an iris (not shown), and an actuator 17 for a shutter which opens and closes a mechanical shutter. The above-described respective motors and actuators 14 to 17 are driven by various drivers 18 to 21, for zooming, for focusing, for an iris, and for a shutter, which are provided at a driver block 2. The respective motors 14, 15 and actuators 14 to 17, and the driver block 2 configure driving means.

The electronic still camera has a CCD image-pickup system block 3 including mainly a CCD 31 which is an image pickup element arranged at the rear side of the photographing optical axis of the lens group 11, a CDS (Correlated Double Sampling)/AD conversion block 32, and a TG (Timing Generator) 33. When the electronic still camera is set to a recording mode for photographing, the CCD 31 photoelectric-converts an optical image of an object which is formed by the lens group 11, and outputs, each given cycle, one photoelectric-converted output screen by being scanning-driven by the TG 33. The CDS/AD block 32 carries out noise elimination due to correlated double sampling and conversion into a digital signal with respect to an output analog signal whose gain has been appropriately adjusted for each of the color components of RGB by an amplifier (not shown) after being output from the CCD 31, and outputs the signal as an image pickup signal to a color process circuit 4.

The color process circuit 4 performs color process processing including pixel interpolation processing to the input image pickup signal, generates digital-valued luminance signal (Y) and color-difference signals (Cb, Cr), and outputs the signals to a CPU 5 serving as control unit for controlling the entire electronic still camera. The CPU 5 comprises a microprocessor having an internal memory, various arithmetic processing circuits, an I/O interface for data, and the like.

The digital signal (image signal) transmitted to the CPU 5 is temporarily stored in a DRAM 6 and transmitted to an image display unit 7. The image display unit 7 includes a video encoder, a VRAM, a liquid crystal monitor, and a driving circuit thereof, and generates a video signal based on the transmitted video signal by the video encoder, and a display image based on the video signal, i.e., a through image of the object picked up by the CCD 31 is displayed on the liquid crystal monitor.

A key input unit 8 comprises various keys such as a power key, a recording/playback mode change-over switch, a shutter key, a menu key, or the like, and a sub-CPU which receives input therefrom and transmits an operation signal corresponding thereto to the CPU 5. The sub-CPU transmits a state signal showing a state of the mode change-over switch, i.e., a mode setting state as needed. When the shutter key is pressed down in the aforementioned recording mode, a trigger signal (operation signal) is output from the key input unit 8 to the CPU 5.

When the trigger signal is input, the CPU 5 reads out, for each of the components of Y, Cb, Cr and in basic units called basic blocks which are 8 pixels (vertical)×8 pixels (horizontal), the image data of one screen fetched from the CCD 31 at that point in time, and writes the image data into a JPEG circuit 9. The JPEG circuit 9 carries out DCT (Discrete Cosine Transform) and coding. The compressed one-image data compressed by the JPEG circuit 9 is stored in an image recording unit 42. The image recording unit 42 comprises a card interface, and nonvolatile various memory cards which are connected to the CPU 5 via the card interface, and which are mounted so as to be freely attachable and detachable on a camera body.

In the recording mode for photographing, the CPU 5 makes a lens control block 43 generate driving signals to be transmitted to the various drivers 18 to 21 of the driver block 2 on the basis of various programs stored in a rewritable nonvolatile flash memory 41, the aforementioned operation signal from the key input unit 8, or the like, and controls the position controls of the zoom lens and focus lens, an opening of the iris, and the opening and closing action of the mechanical shutter. Positional information of the lens detected by the position detecting sensors 12, 13 for a zoom position and a focus position are successively input to the CPU 5 via the lens control block 43.

On the other hand, the image data recorded in the image recording unit 42 is read by the CPU 5 in the playback mode for displaying the recorded image, transmitted to the image display unit 7 after being expanded by the JPEG circuit 9, and displayed on the liquid crystal monitor.

Figure 2:
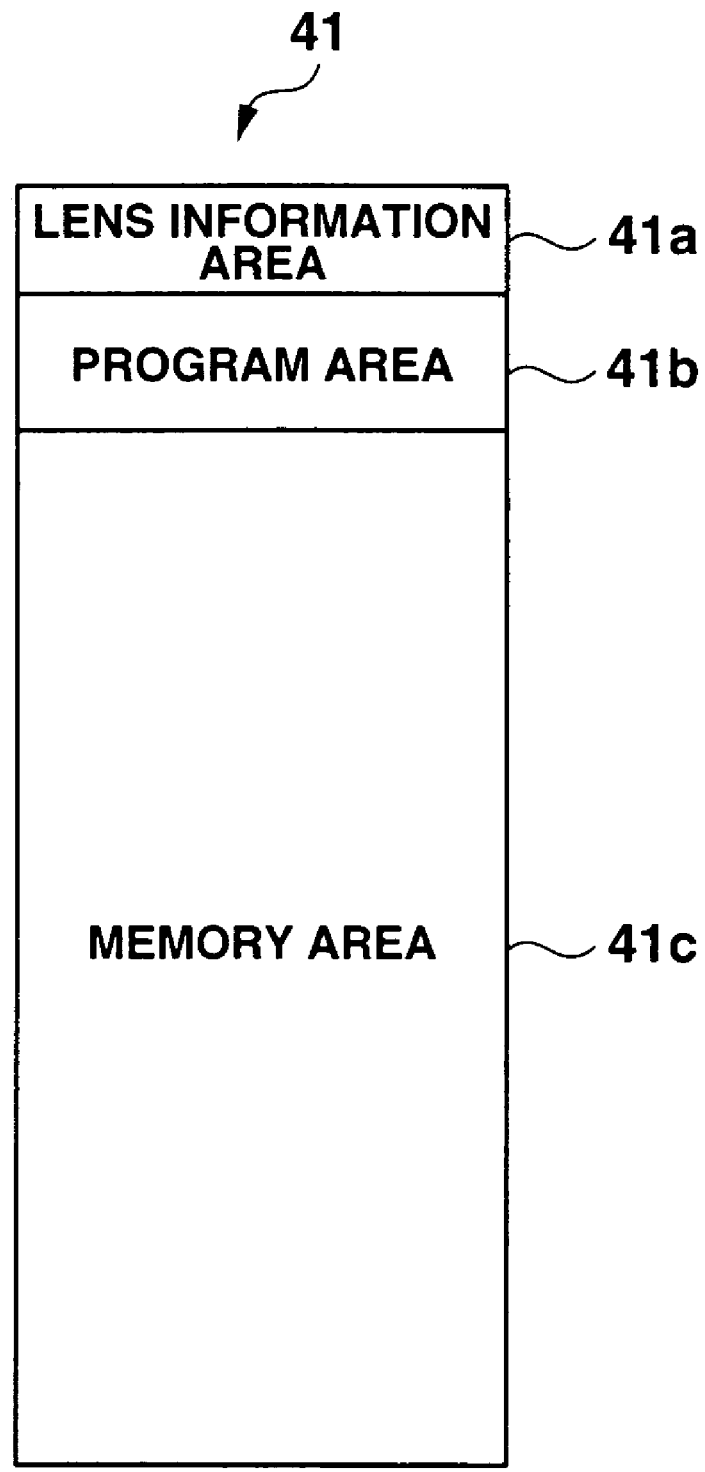
FIG. 2 is a schematic diagram showing a data storing structure of a flash memory in the electronic still camera of the embodiment.

FIG. 2 is a schematic diagram showing a data storing structure of the aforementioned flash memory 41. The flash memory 41 is storage means, and a lens information area 41$a$, a program area 41$b$, and memory area 41$c$ for various data are ensured therein. At the lens information area 41$a$, device information which is the data acquired at the stage of factory shipping of the electronic still camera, and which shows the movement performance of the lens group 11 (the zoom lens and the focus lens), and which is the adjustment data which is indispensable for controlling those, is stored. Moreover, at the lens information area 41$a$, device information of the image pickup system of the CCD 31, white balance characteristic, or the like, as well, are stored.

Figure 3:
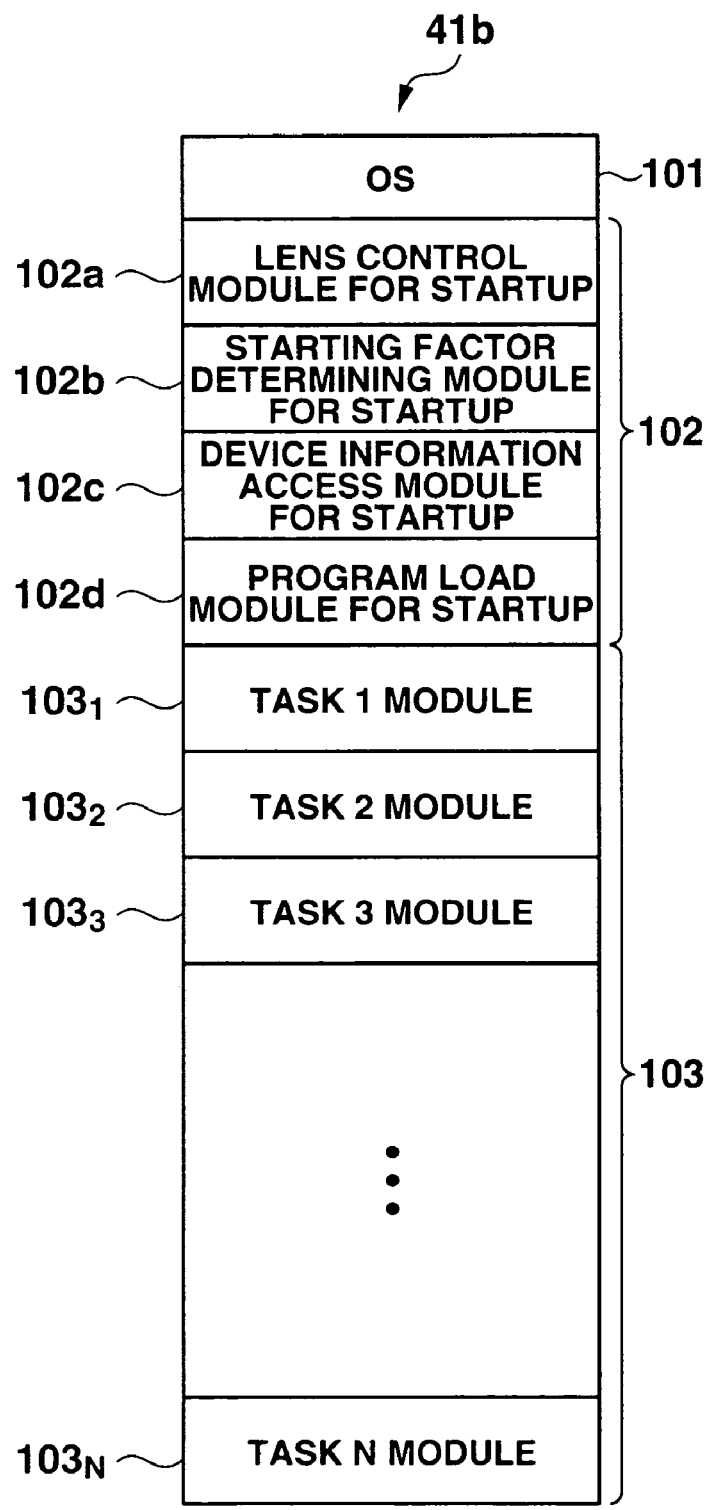
FIG. 3 is a schematic diagram showing stored data at a program area of the flash memory.

At the program area 41$b$, programs required for the control the aforementioned respective portions by the CPU 5, and various data required for the control are stored. In the present embodiment, as one example, as shown in FIG. 3, at the head portion of the program area 41$b$, an OS (Operating System) 101 which is indispensable for the operation of the CPU 5 and a startup program 102 comprising a lens control module 102$a$ for startup, a starting factor determining module 102$b$ for startup, a device information access module 102$c$ for startup, and a program load module 102$d$ for startup, which will be described later and are required for startup processings, are stored in a sequential order, and continuously, a main program 103 formed from a plurality of task modules 103$_1$, 103$_2$, . . . 103$_N$ (TASK 1, TASK 2, TASK 3, . . . TASK N) which are required for realizing various operations in the electronic still camera are stored.

The memory area 41$c$ is an area which is managed by a file system configured by the CPU 5 after the startup of the OS, and various data which are read from the CPU 5 as needed and which are other than the above-described data are stored thereat. At this area, arbitrary data including image data as well are stored as needed.

Figure 4:
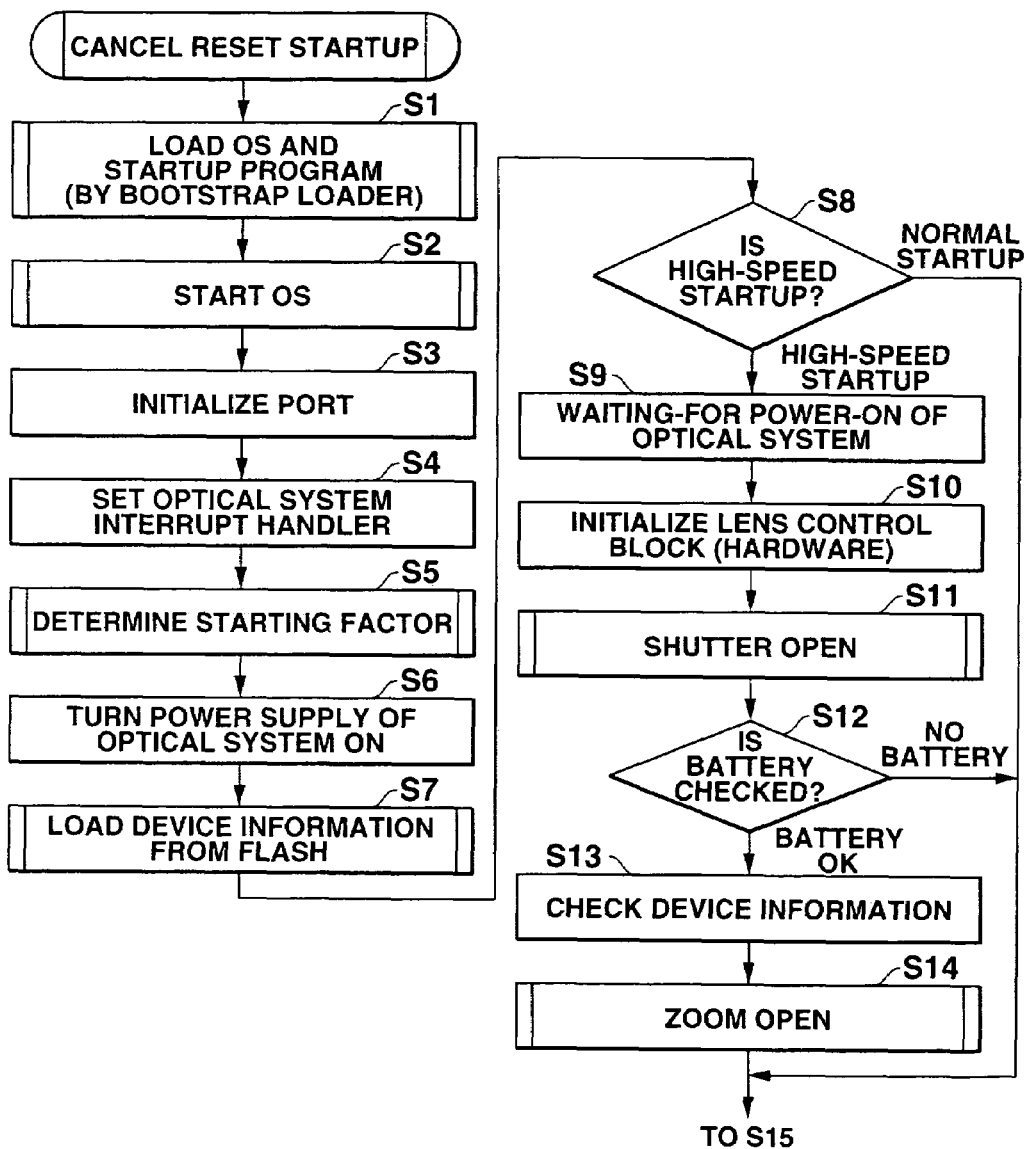
FIG. 4 is a former part of a flowchart showing a processing procedure of a CPU at the time of startup of the electronic still camera of the embodiment.
Figure 5:
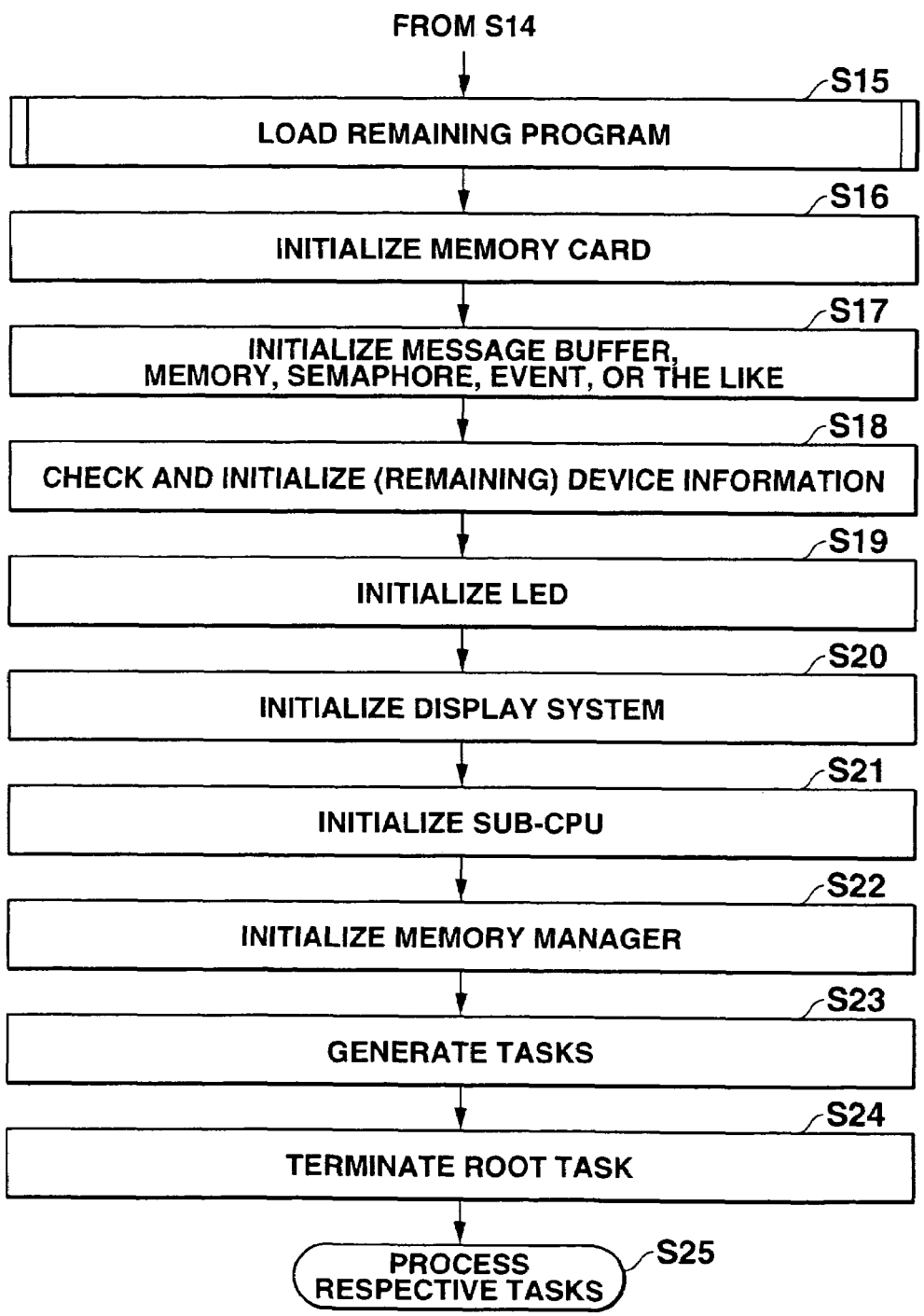
FIG. 5 is a latter part of the flowchart showing the processing procedure of the CPU at the time of startup of the electronic still camera.

Next, operations according to the present embodiment of the electronic still camera comprising the above-described configuration will be described in accordance with FIGS. 4 and 5. Flowcharts of FIGS. 4 and 5 show the concrete processing procedures of the CPU 5 at the time of startup accompanying an ON-operation of the power switch.

Figure 6:
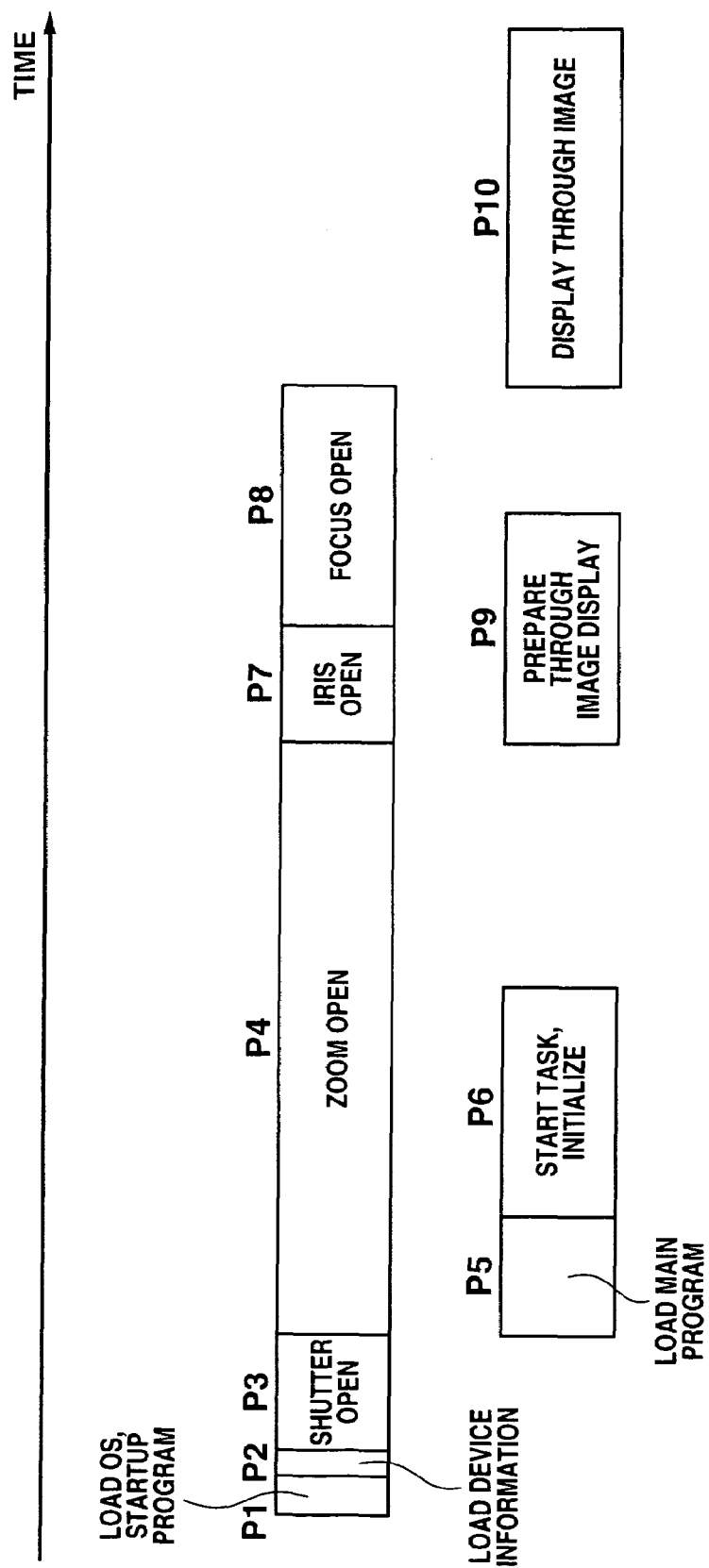
FIG. 6 shows a sequence of main operations performed after the camera device is started when the recording mode is set.

After the CPU 5 is started up accompanying power-on, the CPU 5 loads only the OS 101 and the startup program 102 from the program area 41$b$ of the flash memory 41 by bootstrap loader, and expands those in the internal memory, and thereafter, the CPU 5 starts up the OS (steps S1 and S2 and period P1 in FIG. 6). The bootstrap loader is a small program which is read for loading the program, and is to be automatically accessed by the CPU 5 at the same time of the startup, and is stored in a predetermined address area (other than the memory area 41$c$) of the flash memory 41. Thereafter, the CPU 5 processes root tasks from step S3 up to step S24 on the basis of the startup program 102.

Setting of hardware such as an initialization of a port or the like is carried out (step S3), and setting of an optical system interrupt handler, i.e., setting of interrupt processing required for the control of the lens group 11 is carried out (step S4). A state signal is received from the sub-CPU of the key input unit 8, and a determination of a starting factor is carried out (step S5). Here, it is determined whether the mode state which has been set is a recording mode for photographing or another mode other than the recording mode, such as a playback mode for displaying a recorded image or the like. The difference between the recording mode and the playback mode is whether or not a lens is required to be protruded when the power is turned on. If the operation mode is the recording mode, the lens is required to be protruded when the power is turned on. The power supply of the optical system such as the lens block 1, the driver block 2, and the lens control block 43 is controlled so as to be turned on (step S6), and device information is loaded from the flash memory 41 (step S7 and period P2 in FIG. 6). It is determined whether high-speed startup is carried out or normal startup is carried out on the basis of the determined results of the starting factor acquired in step S5 (step S8). When the mode which has been set is the recording mode, it is determined as the high-speed startup, and when the mode is another mode other than it, it is determined as the normal startup.

When the starting factor is the normal startup, the processings of the following steps S9 to S14 are not carried out, loading of the main program 103 which is the remaining control program is immediately started (step S15).

On the other hand, when the starting factor is the high-speed startup, a predetermined time (for example, 30 ms or less) until the time when a voltage of the optical system started to be supplied in step S6 rises a steady-state voltage is waited for (step S9), and an initialization of the hardware in the lens control block 43 is carried out (step S10). The shutter actuator 17 is made to start shutter open of the mechanical shutter (step S11 and period P3 in FIG. 6), a battery voltage is checked at this point in time, and it is determined whether or not the battery voltage exceeds a predetermined voltage (step S12). Note that, some waiting-for processings are carried out during from the time when the shutter open of the mechanical S shutter is started to the time of the check for the battery voltage. Here, when the voltage value is the predetermined value or less, and it is determined as "No Battery," the processings of the following steps S13 and S14 are not carried out, loading of the main program 103 which is the remaining control program is immediately started (step S15).

On the other hand, when the voltage value exceeds the predetermined value, and it is determined as "Battery OK," a check and an initialization of the adjustment data for the zoom lens and the focus lens among the device information loaded in step S7 are carried out (step S13), and the protrusion (zoom-open) of the zoom lens for an initialization of the lens group 11 is made to start (step S14 and period P4 in FIG. 6).

Immediately after the above-described zoom-open processing (step S14) of the zoom lens is started, the CPU 5 starts loading of the remaining program (step S15 and period P5 in FIG. 6). Namely, without the end of the zoom-open operation of the lens group 11 being waited for, the main program 103 is loaded simultaneously.

Continuously, an initialization of the hardware, i.e., a memory card of the image recording unit 42, a message buffer, the DRAM 6 or the like (steps S16, S17), checking of the remaining data of the device information (other than the adjustment data of the zoom lens and the focus lens), and an initialization of the CCD image pickup system block 3 by using those data (step S18), and initializations of an LED and the display system (steps S19, S20) are carried out. Moreover, initializations of the software, i.e., initialization of the sub-CPU (various settings) and an initialization of a memory manager are carried out (steps S21, S22). Some of initializations of the sub-CPU are already carried out at the time of the determination of a starting factor in step S5. After the respective tasks realizing various operations in the main program 103 which completed loading are generated (step S23), the termination processing of the root task is carried out (step S24 and period P6 in FIG. 6). After these processings, the memory area 41c becomes a usable state.

Hereafter, the routine proceeds to the execution of the processings corresponding to the respective modes for recording and playback in the same way as in the normal processing based on the processings of the plurality of tasks generated (step S25). Namely, the CPU 5 executes the following processings by executing the respective tasks in accordance with the main program 103.

First, when the determined result in step S12 described above is "No Battery," a predetermined termination processing is carried out. Further, when the determined result is "Battery OK," the routine proceeds to a processing corresponding to an operation mode which has been set, and the processing by a recording mode or a playback mode is carried out. When the recording mode is set, as shown in FIG. 6, the iris is made to be in a state of being open by driving the actuator 16 for iris (period P7) after the termination of the zoom-open operation of the zoom lens started at the above-described step S13. Thereafter, the focus motor 15 is driven, and a movement to the initial position of the focus lens (FOCUS OPEN) in the lens group 11 is started (period P8). Further, during the time, about that time of the control of the iris, a preparation for startup of a through image by an initialization of the image pickup system of the CCD 31, the white balance characteristic, and the like is started, and the preparation is completed during the operation of the focus motor 15 (period P9). Thereafter, at the point in time when the focus lens reach the initial position, the through image is displayed on the image display unit 7 (period P10), and the routine comes into a state of being on standby for photographing.

As described above, in the present embodiment, the device information including the lens information is stored in the lens information area 41a of the flash memory 41, that is, the area that can be used before a file system is configured. Accordingly, the device information can be immediately read upon activation. Thus, before a file system is configured in the flash memory 41, driving can be started to initialize the zoom lens. Then, while the zoom lens is being initialized, other initialization processes for software including the configuration of a file system can be executed. Consequently, even if the device is configured to have the sinkable lens group 11, it is possible to further reduce the activation time required before photographing can be executed.

In the illustrated embodiment, the CPU 5 starts an operation of protruding the lens group 11 immediately after the startup program 102 has been loaded. While the lens group 11 is being protruded, the CPU 5 loads the main program 103 and concurrently performs operations required for the initialization on the basis of the main program 103. However, the CPU 5 may load the startup program 102 and the main program 103 at a time and at this time start an operation of protruding the lens group 11.

Furthermore, in the illustrated present embodiment, the lens information area 41a is provided in the flash memory 41, and the device information (lens information) is stored in the lens information area 41a. However, the lens information area 41a may be omitted and the device information (lens information) may be stored in the program area 41b. Moreover, the device information (lens information) has only to be stored in an area other than the memory area 41c. For example, as in the case of the previously described boot loader, the CPU 5 may automatically store the device information (lens information) at accessible fixed addresses in the flash memory 41 simultaneously with activation. Specifically, before the OS 101 and the startup program 102 are activated, the previously described process may be executed after the device information has been loaded.

Furthermore, in the present embodiment, the illustrated electronic still camera comprises the sinkable lens group 11 including the zoom lens and the focus lens. The present invention is not limited to this embodiment. The camera need not be of the sinkable lens type but may effectively comprise a zoom lens or focus lens driven to a predetermined position in association with initialization executed upon activation. Moreover, an arrangement comprising only a focus lens can produce effects similar to those of the present embodiment by storing at least the lens information in an area that can be used before a file system is configured in the flash memory 41.

FIG. 7 corresponds to FIG. 6 and shows operations of another embodiment of the present invention in which the electronic still camera shown in FIG. 1 is free from the zoom function and has only a focus lens in the lens group 11.

Description will be given of the operations under the assumption that the record mode for photographing is set before activation. If the camera has only a focus lens, then upon activation, the OS 101 and the startup program 102 are first loaded and activated as in the case of an embodiment also having a zoom lens. Thus, the device information is loaded and the shutter is opened (periods P1 to P3 in FIG. 7). Subsequently, in contrast to the first embodiment, the iris actuator 16 is driven to open the iris (period P7). Then, the focus motor 15 is driven to start moving the focus lens to its initial position (FOCUS OPEN) (period P12). That is, instead of the zoom lens, the iris and the focus lens are initialized during these periods. In the meantime, concurrently with the control of the iris, the remaining main program 103 starts to be loaded (period PS). While the focus lens is being moved, each task of the main program 103 is generated for activation (period P6). Subsequently, once the focus lens is completely initialized, preparations are made for activation of a through image (period P9). Once the preparations are ended, the through image is displayed on the image display screen 7 (period P10). The device is thus brought into a photographing standby state.

Accordingly, in an arrangement comprising only a focus lens, at least lens information is stored in an area that can be used before a file system is configured in the flash memory 41. Then, before the file system is configured in the flash memory 41, driving can be started to initialize the focus lens. Then, while the focus lens is being initialized, other initialization processes for software can be executed including the configuration of the file system. Consequently, effects similar to those of the previously described embodiment can be produced.

Moreover, in the above described activation method, the contents of the process are the same in the case where the device has a zoom lens and in the case where the device does not have any zoom lenses, except for the presence of initialization of the zoom lens. Accordingly, the following advantages are obtained. For example, the previously described device information includes flag information indicating whether or not the zoom lens and the focus lens need to be initialized. Thus, the flag information is used to check whether or not the zoom lens and the focus lens need to be initialized. Then, both zoom lens and focus lens may be initialized, only the focus lens may be initialized, or the initialization processes for both zoom lens and focus lens may be skipped. That is, the same activation program can be used for any of the three types of camera devices having different optical system configurations. Therefore, the same activation program can be shared by different device types.

As described above, with the camera device according to the present embodiment, it is possible to make, concurrently with the initialization of the optical system including the zoom and/or focus lens, preparations for the start of management of the management area of the memory based on the file management program which are required after activation. Accordingly, in an arrangement having a sinkable optical system, implementing the present embodiment enables a further reduction in activation time. The activation time can also be further reduced in an arrangement which is not sinkable but which comprises a zoom lens or a focus lens or both driven to a predetermined position in association with initialization executed when the device is activated.

When a computer program according to the embodiment is installed in a camera having a computer, it is possible to realize the camera device of the embodiment.

What is claimed is:

1. A camera device comprising:
an optical system which, upon initialization, is driven to a predetermined position when the camera device is started up in a state in which a recording mode for photographing has been set;
a memory including an area for storing lens information inherent to the optical system, an area for storing a file management program, and a management area which is managed by using the file management program, the area for storing the lens information differing from the management area; and
a controller which controls the initialization of the optical system based on the lens information stored in the memory when the camera device is started up in the state in which the recording mode for photographing is set, and which suspends the initialization of the optical system and starts execution of the file management program to enable the management area to be used when the camera device is started up in a state in which a playback mode for display is set.

2. A camera device according to claim 1, wherein the optical system comprises a zoom lens.

3. A camera device according to claim 1, wherein the optical system comprises a focus lens.

4. A camera device according to claim 2, wherein the optical system comprises a focus lens.

5. A method for controlling a camera device, wherein the camera device comprises: (i) an optical system which, upon initialization, is driven to a predetermined position when the camera device is started up in a state in which a recording mode for photographing has been set, and (ii) a memory including an area for storing lens information inherent to the optical system, an area for storing a file management program, and a management area which is managed by using the file management program, the method comprising:
storing the lens information in the area for storing lens information in the memory, the area for storing lens information being different from the management area; and
controlling the initialization of the optical system based on the lens information stored in the predetermined area when the camera device is started up in the state in which the recording mode for photographing is set, and suspending the initialization of the optical system and starting execution of the file management program to enable the management area to be used when the camera device is started up in a state in which a playback mode for display is set.

* * * * *